(12) United States Patent
Matsuzaka et al.

(10) Patent No.: US 8,993,164 B2
(45) Date of Patent: Mar. 31, 2015

(54) SUPPORT FOR CATALYST SUPPORTING, CARRIER WITH SUPPORTED CATALYST, ELECTRODE, AND BATTERY

(75) Inventors: Erina Matsuzaka, Chiba (JP); Takeaki Kishimoto, Funabashi (JP); Jun-ichi Ozaki, Kiryu (JP)

(73) Assignees: Nisshinbo Holdings Inc., Tokyo (JP); National University Corporation Gunma University, Gunma (JP)

( * ) Notice: Subject to any disclaimer, the term of this patent is extended or adjusted under 35 U.S.C. 154(b) by 0 days.

(21) Appl. No.: 13/513,045

(22) PCT Filed: Dec. 3, 2010

(86) PCT No.: PCT/JP2010/071657
§ 371 (c)(1),
(2), (4) Date: May 31, 2012

(87) PCT Pub. No.: WO2011/070975
PCT Pub. Date: Jun. 16, 2011

(65) Prior Publication Data
US 2012/0231338 A1  Sep. 13, 2012

(30) Foreign Application Priority Data
Dec. 7, 2009  (JP) ................. 2009-277825

(51) Int. Cl.
*H01M 4/13*  (2010.01)
*H01M 4/90*  (2006.01)
(Continued)

(52) U.S. Cl.
CPC .............. *H01M 4/9083* (2013.01); *B82Y 30/00* (2013.01); *H01M 4/9008* (2013.01); *Y02E 60/50* (2013.01); *H01M 4/663* (2013.01); *H01M 4/926* (2013.01); *C01B 31/04* (2013.01)

USPC .............. 429/218.1; 502/182; 428/402

(58) Field of Classification Search
CPC ............... C01B 2203/1082; C01B 4841/009; B82Y 30/00
See application file for complete search history.

(56) References Cited

U.S. PATENT DOCUMENTS 7,718,156 B2 * 5/2010 Zhang et al. .............. 423/445 R
7,776,477 B2 * 8/2010 Hasegawa ................. 429/232
(Continued)

FOREIGN PATENT DOCUMENTS

EP  1 939 141 A1  7/2008
JP  A-47-21388  10/1972
(Continued)

OTHER PUBLICATIONS

Chu et al., Mat Chem Phys 96 (2006) 253-277, Apr. 2006.*
(Continued)

*Primary Examiner* — Ula C. Ruddock
*Assistant Examiner* — Lisa S Park Gehrke
(74) *Attorney, Agent, or Firm* — Oliff PLC

(57) ABSTRACT

A support for carrying a catalyst is obtained by carbonizing raw materials containing a nitrogen-containing organic substance and a metal. The support for carrying a catalyst may have a peak at a diffraction angle of around 26° in an X-ray diffraction pattern, the peak including 20 to 45% of a graphite-like structure component and 55 to 80% of an amorphous component. In addition, the support for carrying a catalyst may have an intensity ratio of a band at 1,360 cm$^{-1}$ to a band at 1,580 cm$^{-1}$ ($I_{1,360}/I_{1,580}$) in a Raman spectrum of 0.3 or more and 1.0 or less. In addition, the support for carrying a catalyst may be obtained by carbonizing the raw materials to obtain a carbonized material, subjecting the carbonized material to a metal removal treatment, and subjecting the resultant to a heat treatment.

19 Claims, 4 Drawing Sheets

(51) Int. Cl.
- *H01M 4/92* (2006.01)
- *C01B 31/04* (2006.01)
- *B82Y 30/00* (2011.01)
- *H01M 4/66* (2006.01)

(56) References Cited

U.S. PATENT DOCUMENTS

| | | | |
|---|---|---|---|
| 2005/0281729 A1 | 12/2005 | Suzuki et al. | |
| 2006/0013757 A1* | 1/2006 | Edwin et al. | 423/447.3 |
| 2007/0042901 A1* | 2/2007 | Kurose et al. | 502/180 |
| 2007/0184972 A1* | 8/2007 | Roev et al. | 502/180 |
| 2008/0152576 A1 | 6/2008 | Zhang et al. | |
| 2008/0283413 A1 | 11/2008 | Suzuki et al. | |
| 2010/0323272 A1* | 12/2010 | Ozaki et al. | 429/484 |

FOREIGN PATENT DOCUMENTS

| | | |
|---|---|---|
| JP | A-2000-268828 | 9/2000 |
| JP | A-2000-273251 | 10/2000 |
| JP | A-2004-362802 | 12/2004 |
| JP | A-2005-19332 | 1/2005 |
| JP | A-2007-26746 | 2/2007 |
| JP | A-2007-311026 | 11/2007 |
| JP | A-2008-108495 | 5/2008 |
| JP | A-2008-282725 | 11/2008 |
| JP | A-2009-133037 | 6/2009 |
| WO | WO 03/097910 A2 | 11/2003 |
| WO | WO 2004/112174 A1 | 12/2004 |
| WO | WO 2006/088194 A1 | 8/2006 |
| WO | WO 2009/098812 A1 | 8/2009 |

OTHER PUBLICATIONS

Walker et al, ASTM Bulletin, No. 208, 1955, 52-54, Sep. 1955.*
International Search Report issued in International Patent Application No. PCT/JP2010/071657 dated Mar. 15, 2011.
International Preliminary Report on Patentability issued in International Patent Application No. PCT/JP2010/071657 dated Jul. 10, 2012.
May 7, 2014 Office Action issued in Japanese Patent Application No. 2011-157904 (with partial translation).
Nov. 20, 2014 Search Report issued in European Patent Application No. 10835896.1.
Jul. 21, 2014 Office Action issued in Chinese Patent Application No. 201080055514.7 (with Partial English Translation).

* cited by examiner

FIG.2

| | SUPPORT | XRD | | RAMAN SPECTROSCOPY | ENDURANCE RATIO OF CARRIER WITH SUPPORTED CATALYST (%) | AMOUNT OF CATALYST CARRIED (wt%) |
|---|---|---|---|---|---|---|
| | | GRAPHITE-LIKE STRUCTURE (%) | AMORPHOUS (%) | INTENSITY RATIO D/G ($I_{1360}/I_{1580}$) | | |
| EXAMPLE1 | IK(Co)1000°CAW | 30 | 70 | 0.65 | 99 | 8.4 |
| EXAMPLE2 | IK(Mn)800°CAW | 39 | 61 | 0.71 | 98 | 7.3 |
| EXAMPLE3 | IK(Fe)800°CAW | 34 | 66 | 0.63 | 96 | 6.7 |
| EXAMPLE4 | IK(Co)1000°C(−) | 31 | 69 | 0.65 | 94 | 5.9 |
| COMPARATIVE EXAMPLE1 | KB | 1 | 99 | 1.27 | 45 | 6.3 |
| COMPARATIVE EXAMPLE2 | GCB | 51 | 49 | 0.19 | 84 | 1.5 |
| COMPARATIVE EXAMPLE3 | Gr | 64 | 36 | 0.13 | 89 | 0.8 |
| COMPARATIVE EXAMPLE4 | IK(−)1000°CAW | 26 | 74 | 0.85 | 65 | 4.0 |
| COMPARATIVE EXAMPLE5 | IK(−)1000°C(−) | 27 | 73 | 0.84 | 64 | 3.7 |

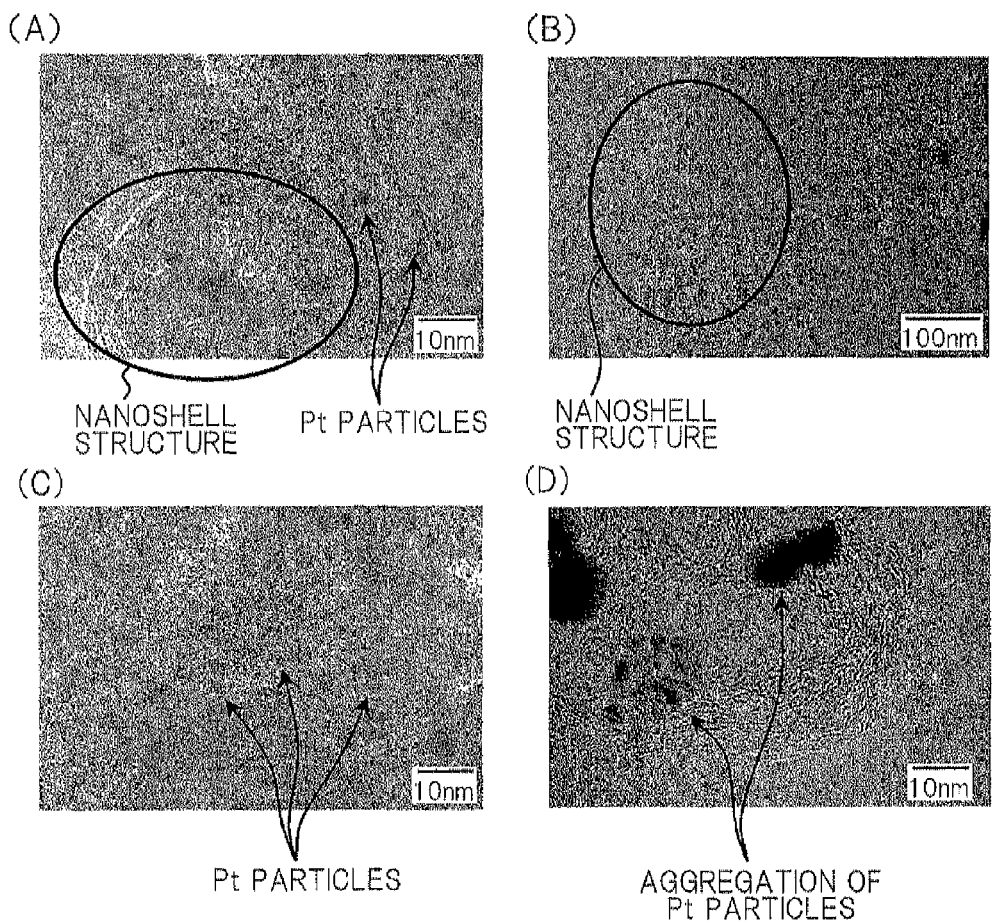

SUPPORT FOR CATALYST SUPPORTING, CARRIER WITH SUPPORTED CATALYST, ELECTRODE, AND BATTERY

TECHNICAL FIELD

The present invention relates to a support for carrying a catalyst, a carrier with supported catalyst, an electrode, and a battery, and more particularly, to a support for carrying a catalyst formed of a carbonized material.

BACKGROUND ART

A polymer electrolyte fuel cell (PEFC) can operate in a low temperature region, has high energy conversion efficiency, and can be started in a short period of time, and a system of the PEFC can be reduced in size and weight. The PEFC is therefore expected to find applications in a power source for an electric vehicle, a portable electric power source, and a residential cogeneration system.

In the PEFC, a cathode catalyst layer is temporarily exposed to a high potential (e.g., 0.8 V or more) during repeated start-stop operation. In this case, when water is decomposed by an action of a noble metal such as platinum (Pt) serving as a cathode catalyst to generate oxygen, a carbon material carrying the noble metal undergoes oxidation corrosion by the oxygen, resulting in decomposition and deterioration of a catalyst support. The deterioration of the catalyst support reduces power generation performance of the PEFC, promotes dissolution and sintering of the noble metal such as Pt, and causes an additional reduction in catalytic activity.

In view of the foregoing, there has been developed such a carbon material for carrying a catalyst as to have high durability even under a high potential condition, to allow a noble metal catalyst such as Pt to be carried with high efficiency in a highly dispersed state in the order of several nm, and to cause no aggregation of the noble metal catalyst and the like.

A highly crystalline carbon material such as graphite is excellent in terms of durability but is not preferred in terms of an amount of a catalyst to be carried. This is because the highly crystalline carbon material such as graphite has a small specific surface area. In general, therefore, a trade-off relationship is found between the durability of the carbon material for carrying a catalyst and the amount of a catalyst to be carried.

Conventionally, for example, Patent Document 1 describes that carbon black or activated carbon is subjected to a heating treatment at 1,800 to 2,500° C. to increase its degree of graphitization, thereby providing a highly crystalline carbon material having high crystallinity.

In addition, Patent Document 2 describes that graphitized carbon black having excellent corrosion resistance is obtained by a method subjecting a mixture containing carbon black and a graphitization-promoting substance (B, Si, Al, Fe, or other compounds containing those atoms) to a heating treatment at 2,000 to 2,500° C., or a method further performing an activating treatment before or after the heating treatment.

In addition, Patent Document 3 describes that a carbon-based catalyst support is subjected to electrochemical oxidation in advance to improve its durability. In addition, Patent Document 4 describes that a carbon material (carbon black or carbon nanotube) carrying a noble metal catalyst is subjected to a heat treatment at 300 to 1,200° C. under an inert gas atmosphere to suppress corrosion of the carbon material.

In addition, Patent Documents 5 and 6 describe that a carbon alloy fine particle doped with nitrogen atoms and/or boron atoms is obtained as a base material for an electrode catalyst for a fuel cell by subjecting a thermosetting resin containing a nitrogen compound to a heat treatment at 400 to 1,500° C.

In addition, Patent Document 7 describes that a carbon material carrying a noble metal particle is obtained by adding and mixing a metal compound (at least one of iron, cobalt, nickel, chromium, and manganese) to a raw material for generating non-graphitizable carbon (selected from the group consisting of a thermosetting resin including polyfurfuryl alcohol, a furan resin, or a phenolic resin, brown coal, cellulose, polyvinylidene chloride, and lignin) and then carbonizing the mixture by a heat treatment.

PRIOR ART DOCUMENT

Patent Document

[Patent Document 1] JP 2000-268828 A
[Patent Document 2] JP 2000-273251 A
[Patent Document 3] JP 2008-108495 A
[Patent Document 4] WO 2006/088194 A1
[Patent Document 5] JP 2004-362802 A
[Patent Document 6] JP 2007-311026 A
[Patent Document 7] JP 2005-019332 A

DISCLOSURE OF THE INVENTION

Problems to be Solved by the Invention

In the technology described in Patent Document 1, however, during manufacture of the highly crystalline carbon material, it is necessary to perform the heating treatment at a very high temperature of 1,800° C. or more, resulting in an increase in energy cost. In addition, the highly crystalline carbon material has a small specific surface area because of its high degree of graphitization and thus hardly carries a noble metal catalyst such as Pt. Hence, it cannot necessarily be said that the highly crystalline carbon material is an excellent support.

In addition, in the technology described in Patent Document 2, during manufacture of the graphitized carbon black, it is necessary to perform the heating treatment at a very high temperature of 2,000° C. or more and also to perform the activating treatment, resulting in an increase in energy cost and complicated operations. It is therefore not easy to put such technology into practical use.

In addition, in the technology described in Patent Document 3, it is necessary to further perform the treatment for subjecting the carbon material once manufactured to electrochemical oxidation, resulting in complicated operations. In addition, in the technology described in Patent Document 4, after the carbon material has been caused to carry the noble metal catalyst, it is necessary to further perform the heat treatment, resulting in complicated operations. In addition, the heat treatment may cause aggregation and sintering of the noble metal catalyst carried.

In addition, Patent Documents 5 to 7 each describe that the amount of a noble metal catalyst such as platinum to be used can be reduced. However, none of the Patent Documents describe or suggest that both of durability of a carrier with supported catalyst and ease of carrying a catalyst (hereinafter, referred to as "performance of a catalyst support") can be achieved.

The present invention has been made in view of the problems. An object of the present invention is to provide a support for carrying a catalyst, a carrier with supported catalyst, an electrode, and a battery, each achieving both of durability and performance of a catalyst support at high levels.

Means for Solving the Problems

A support for carrying a catalyst according to an embodiment of the present invention for achieving the object is obtained by carbonizing raw materials containing a nitrogen-containing organic substance and a metal. According to the present invention, there is provided a support for carrying a catalyst achieving both of durability and performance of a catalyst support at high levels.

In addition, the support for carrying a catalyst may have a peak at a diffraction angle of around 26° in an X-ray diffraction pattern, the peak including 20 to 45% of a graphite-like structure component and 55 to 80% of an amorphous component. In addition, the support for carrying a catalyst may have an intensity ratio of a band at 1,360 cm$^{-1}$ to a band at 1,580 cm$^{-1}$ ($I_{1,136}/I_{1,580}$) in a Raman spectrum of 0.3 or more and 1.0 or less.

In addition, the support for carrying a catalyst may be obtained by carbonizing the raw materials to obtain a carbonized material, subjecting the carbonized material to a metal removal treatment, and subjecting the resultant to a heat treatment. In this case, the metal may be a transition metal.

A carrier with supported catalyst according to an embodiment of the present invention for achieving the object includes any one of the supports for carrying a catalyst and a noble metal catalyst, which is carried by the any one of the supports for carrying a catalyst. According to the present invention, there is provided a carrier with supported catalyst achieving both of durability and performance of a catalyst support at high levels.

In addition, the carrier with supported catalyst may have a ratio of a current value upon application of 1.5 V in the 50th cycle to a current value upon application of 1.5 V in the fifth cycle of 90% or more in the case of performing a cycle of sweeping a potential in the range of 0 to 1.6 V continuously 50 times in cyclic voltammetry.

An electrode according to an embodiment of the present invention for achieving the object includes the carrier with supported catalyst. According to the present invention, there is provided an electrode achieving both of durability and performance of a catalyst support at high levels.

A battery according to an embodiment of the present invention for achieving the object includes the electrode. According to the present invention, there is provided a battery achieving both of durability and performance of a catalyst support at high levels.

Effect of the Invention

According to the present invention, there are provided a support for carrying a catalyst, a carrier with supported catalyst, an electrode, and a battery each achieving both of durability and performance of a catalyst support at high levels.

BRIEF DESCRIPTION OF THE DRAWINGS

[FIG. 2] An explanatory diagram illustrating an example of results of evaluation of a carbon structure of a support for carrying a catalyst according to an embodiment of the present invention, and durability and performance of a catalyst support of a carrier with supported catalyst according to an embodiment of the present invention.

[FIGS. 3(A) to 3(D)] Explanatory Diagrams each illustrating an example of a transmission electron microscope photograph of a carrier with supported catalyst according to an embodiment of the present invention.

[FIG. 4] An explanatory diagram illustrating an example of results of evaluation of the oxygen reduction activity of a carrier with supported catalyst according to an embodiment of the present invention.

MODE FOR CARRYING OUT THE INVENTION

Figure 1:
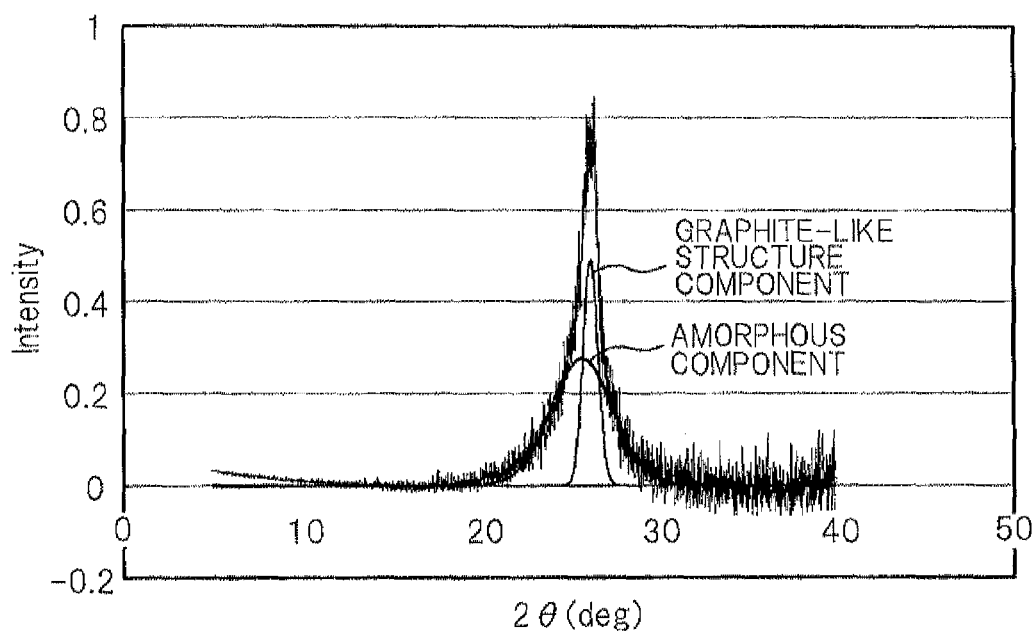
[FIG. 1] An explanatory diagram illustrating an example of peak separation in an X-ray diffraction pattern obtained for a support for carrying a catalyst according to an embodiment of the present invention.

Hereinafter, an embodiment of the present invention is described. It should be noted that the present invention is not limited to an example shown in this embodiment.

A support for carrying a catalyst according to this embodiment (hereinafter, referred to as "support of the present invention") is a support for carrying a noble metal catalyst and is obtained by carbonizing raw materials containing a nitrogen-containing organic substance and a metal.

The nitrogen-containing organic substance in the raw materials is not particularly limited as long as it contains an organic compound containing a nitrogen atom in a molecule thereof and is carbonized (used as a carbon source), and one or two or more kinds of arbitrary nitrogen-containing organic substances may be used.

That is, for example, one or both of a high-molecular weight organic compound (e.g., a resin such as a thermoplastic resin or a thermosetting resin) and a low-molecular weight organic compound may be used as the nitrogen-containing organic substance. A biomass such as a green waste may also be used.

For example, a ligand that coordinates to a metal may be preferably used as the nitrogen-containing organic substance. That is, in this case, a nitrogen-containing organic compound containing one or more ligand atoms in a molecule thereof is used. More specifically, for example, a nitrogen-containing organic compound containing, as a ligand atom, one or two or more kinds selected from the group consisting of a nitrogen atom, a phosphorus atom, an oxygen atom, and a sulfur atom in a molecule thereof may be used. For example, a nitrogen-containing organic compound containing, as a ligand group, one or two or more kinds selected from the group consisting of an amino group, a phosphino group, a carboxyl group, and a thiol group in a molecule thereof may also be used.

Specifically, as the nitrogen-containing organic compound, there may be used, for example, one or two or more kinds selected from the group consisting of pyrrole, polypyrrole, polyvinylpyrrole, 3-methylpolypyrrole, vinylpyridine, polyvinylpyridine, imidazole, 2-methylimidazole, aniline, polyaniline, polyaminobismaleimide, polyimide, benzimidazole, polybenzimidazole, polyamide, acrylonitrile, polyacrylonitrile, chitin, chitosan, silk, wool, polyamino acid, a nucleic acid, DNA, RNA, hydrazine, hydrazide, urea, salen, polycarbazole, polybismaleimide, triazine, melamine, a melamine resin, and a polyamideimide resin.

In addition, for example, one or two or more kinds selected from the group consisting of food industrial waste such as coffee grounds, used tea leaves, brewer's spent grains, and rice bran, wooden waste such as a forest land remainder material and a building waste, and domestic waste such as sewage sludge may be used as the biomass such as a waste. The nitrogen-containing organic substance may further contain, for example, one or two or more kinds selected from the group consisting of boron, phosphorus, oxygen, and sulfur.

The metal in the raw materials is not particularly limited as long as it does not inhibit the durability and performance of a catalyst support of the support of the present invention, and one or two or more kinds of arbitrary metals may be used. The metal may be, for example, one or two or more kinds selected from the group consisting of Groups 3 to 16 of the periodic table. That is, there may be used one or two or more kinds selected from the group consisting of elements belonging to Group 3A (Group 3), elements belonging to Group 4A (Group 4), elements belonging to Group 5A (Group 5), elements belonging to Group 6A (Group 6), elements belonging to Group 7A (Group 7), elements belonging to Group 8 (Group 8, Group 9, and Group 10), elements belonging to Group 1B (Group 11), elements belonging to Group 2B (Group 12), elements belonging to Group 3B (Group 13), elements belonging to Group 4B (Group 14), elements belonging to Group 5B (Group 15), and elements belonging to Group 6B (Group 16) of the periodic table.

For example, a transition metal (belonging to Groups 3 to 12 of the periodic table) may be preferably used as the metal. Further, a metal belonging to the fourth period of Groups 3 to 12 of the periodic table may be preferably used as the transition metal.

Specifically, for example, there may be preferably used one or two or more kinds selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), lanthanoids (such as cerium (Ce)), and actinoids, and there may be more preferably used one or two or more kinds selected from the group consisting of manganese, iron, cobalt, nickel, and copper.

The metal may be used as a simple substance of the metal or as a compound of the metal. As the metal compound, there may be used, for example, a metal salt, a metal oxide, a metal hydroxide, a metal nitride, a metal sulfide, a metal carbide, or a metal complex. Of those, a metal salt, a metal oxide, a metal sulfide, or a metal complex may be preferably used. It should be noted that when a ligand is used as the organic compound described above, a metal complex is formed in the raw materials.

In addition, the raw materials for the support of the present invention may further contain an electrically conductive carbon material. The electrically conductive carbon material is not particularly limited as long as it imparts electrical conductivity to the support of the present invention or improves the electrical conductivity of the support of the present invention, and one or two or more kinds of arbitrary electrically conductive carbon materials may be used. That is, as the electrically conductive carbon material, there may be used, for example, a carbon material having electrical conductivity and having no catalytic activity in itself.

Specifically, there may be used, for example, one or two or more kinds selected from the group consisting of carbon black, a carbon nanotube, a carbon nanohorn, a carbon nanofiber, a carbon fiber, a carbon fibril, activated carbon, and a graphite powder.

The carbonization of the raw materials, which contain at least such nitrogen-containing organic substance and metal as described above, is performed by heating the raw materials and maintaining the raw materials at such a predetermined temperature that the raw materials are carbonized (carbonization temperature). The carbonization temperature is not particularly limited as long as the raw materials are carbonized at the temperature, and the temperature may be, for example, 300° C. or more. More specifically, the carbonization temperature may be, for example, 300° C. or more and 1,500° C. or less, may be preferably 400° C. or more and 1,200° C. or less, and may be more preferably 500° C. or more and 1,100° C. or less.

A rate of temperature increase upon heating of the raw materials to the carbonization temperature is not particularly limited and may be, for example, 0.5° C./min or more and 300° C./min or less. The time period for which the raw materials are maintained at the carbonization temperature (carbonization time) is not particularly limited as long as the raw materials are carbonized within the time period, and the time period may be, for example, 5 minutes or more. More specifically, the carbonization time may be, for example, 5 minutes or more and 240 minutes or less, and may be preferably 20 minutes or more and 180 minutes or less. In addition, the carbonization is preferably performed in an inert gas such as nitrogen (e.g., in a flow of the inert gas).

The support of the present invention may be obtained as a carbonized material produced by such carbonization of the raw materials. The support of the present invention may also be a pulverized product of the carbonized material. A method of pulverizing the carbonized material is not particularly limited, and for example, a pulverizing apparatus such as a ball mill or a bead mill may be used. The average particle diameter of the support of the present invention after the pulverization may be, for example, 1,000 μm or less, may be preferably 150 μm or less, and may be more preferably 45 μm or less.

The support of the present invention may also be such that nitrogen atoms are introduced (doped) into the carbonized material obtained by the carbonization of the raw materials. For example, a vapor phase doping method such as an ammoxidation method or a CVD method, a liquid phase doping method, or a vapor phase-liquid phase doping method may be employed as a method of introducing nitrogen atoms. Specifically, for example, nitrogen atoms may be introduced into the surface of the carbonized material by: mixing a nitrogen source such as ammonia, melamine, or acetonitrile with the carbonized material; and holding the resultant mixture under the atmosphere of an inert gas such as nitrogen, argon, or helium at a temperature of 550° C. or more and 1,200° C. or less for a time period of 5 minutes or more and 180 minutes or less. In addition, the resultant carbonized material may be subjected to an activating treatment such as carbon dioxide activation, phosphoric acid activation, alkali activation, hydrogen activation, ammonia activation, activation with nitrogen oxide, or electrolytic activation and/or liquid phase oxidation such as nitric acid oxidation, mixed acid oxidation, or hydrogen peroxide oxidation.

The support of the present invention may be, for example, a support for carrying a catalyst obtained by carbonizing the raw materials described above to obtain a carbonized material, subjecting the carbonized material to a metal removal treatment, and subjecting the resultant to a heat treatment.

The metal removal treatment is a treatment for removing the metal in the carbonized material obtained by the carbonization of the raw materials. The metal removal treatment is not particularly limited as long as the metal in the carbonized material is removed, or the amount of the metal is reduced by the treatment, and for example, a washing treatment with an acid or an electrolytic treatment may be performed.

The acid to be used in the acid treatment is not particularly limited as long as an effect of the metal removal treatment is obtained, and one or two or more kinds of arbitrary acids may be used. That is, for example, one or two or more kinds selected from the group consisting of hydrochloric acid (such as concentrated hydrochloric acid), nitric acid (such as concentrated nitric acid), and sulfuric acid (such as concentrated sulfuric acid) may be used. When two or more kinds of acids are used, for example, a mixed acid prepared by mixing concentrated hydrochloric acid and concentrated nitric acid at a predetermined volume ratio (such as aqua regia), or a mixed acid prepared by mixing concentrated nitric acid and concentrated sulfuric acid at a predetermined volume ratio may be used.

For example, a method involving immersing and holding the carbonized material in a solution containing an acid may be employed as a method for the acid treatment.

The heat treatment is performed by maintaining the carbonized material subjected to the metal removal treatment as described above at a predetermined temperature (heat treatment temperature). The heat treatment temperature may be, for example, 300° C. or more, or may be 400° C. or more. More specifically, the heat treatment temperature may be, for example, 300° C. or more and 1,500° C. or less, may be preferably 400° C. or more and 1,400° C. or less, and may be more preferably 500° C. or more and 1,300° C. or less.

The heat treatment temperature may be the same temperature as the carbonization temperature, or may be a temperature different from the carbonization temperature. That is, the heat treatment temperature may be a temperature lower than the carbonization temperature. Alternatively, the heat treatment temperature may be a temperature higher than the carbonization temperature.

Specifically, for example, when the carbonization temperature is 400° C. or more and 1,100° C. or less, the heat treatment temperature may be a temperature that is 300° C. or more and 1,000° C. or less, and is equal to or lower than the carbonization temperature.

A rate of temperature increase upon heating of the carbonized material to the heat treatment temperature and the time period for which the carbonized material is maintained at the heat treatment temperature (heat treatment time) may be the same as those in the case of the carbonization. The heat treatment is preferably performed in an inert gas such as nitrogen (e.g., in a flow of the inert gas). The metal removal treatment and the heat treatment may each be repeated twice or more. The support of the present invention may also be a pulverized product of the carbonized material subjected to the metal removal treatment and the heat treatment.

The support of the present invention may be, for example, a support for carrying a catalyst obtained by carbonizing the raw materials described above to obtain a carbonized material, subjecting the carbonized material to a metal impregnation treatment, and subjecting the resultant to a heat treatment.

The metal impregnation treatment is a treatment for impregnating the carbonized material obtained by the carbonization of the raw materials as described above with a metal. The metal with which the carbonized material is impregnated is not particularly limited as long as it does not inhibit the durability and performance of a catalyst support of the support of the present invention, and one or two or more kinds of arbitrary metals may be used.

The metal may be, for example, one or two or more kinds selected from the group consisting of Groups 3 to 16 of the periodic table. In addition, for example, a transition metal (belonging to Groups 3 to 12 of the periodic table) may be preferably used as the metal. Further, a metal belonging to the fourth period, fifth period, or sixth period of Groups 3 to 12 of the periodic table may be preferably used as the transition metal.

Specifically, for example, there may be preferably used one or two or more kinds selected from the group consisting of titanium, chromium, manganese, iron, cobalt, nickel, copper, zinc, zirconium, niobium, molybdenum, ruthenium, palladium, lanthanum, cerium, and tantalum, and there may be more preferably used one or two or more kinds selected from the group consisting of titanium, iron, cobalt, nickel, copper, zirconium, ruthenium, palladium, and cerium.

In addition, in the metal impregnation treatment, the carbonization material may be impregnated with a metal of a kind different from the metal in the raw materials used in the carbonization describe above. That is, for example, the carbonization material may be impregnated with one or two or more kinds different from the metal in the raw materials and selected from the group consisting of aluminum, silicon, titanium, chromium, manganese, iron, cobalt, nickel, copper, zinc, gallium, zirconium, niobium, molybdenum, ruthenium, indium, tin, lanthanum, cerium, tantalum, and lead or the group consisting of titanium, iron, zirconium, ruthenium, and cerium.

The metal may be used as a simple substance of the metal or as a compound of the metal. As the metal compound, there may be used, for example, a metal salt, a metal oxide, a metal hydroxide, a metal nitride, a metal sulfide, a metal carbide, or a metal complex. Of those, a metal salt, a metal oxide, a metal sulfide, or a metal complex may be preferably used.

A method of impregnating the carbonized material with the metal is not particularly limited as long as at least the surface of the carbonized material is impregnated with the metal, and for example, a method involving bringing the carbonized material into contact with a solution containing the metal may be employed.

That is, the carbonized material may be impregnated with the metal by, for example, immersing and holding the carbonized material in a metal-containing solution. In addition, an acidic solution may be used as the metal-containing solution. In this case, the pH of the metal-containing solution may be, for example, 1 or more and 6 or less.

The subsequent heat treatment is performed by maintaining the carbonized material impregnated with the metal as described above at a predetermined temperature. The heat treatment after the metal impregnation treatment may be performed as in the heat treatment after the metal removal treatment. The metal impregnation treatment and the heat treatment may each be repeated twice or more. The support of the present invention may also be a pulverized product of the carbonized material subjected to the metal impregnation treatment and the heat treatment. In addition, the support of the present invention may be one subjected to the metal impregnation treatment and the subsequent heat treatment and then subjected to the metal removal treatment and the subsequent heat treatment described above. Also in this case, the support of the present invention may be a pulverized product of the carbonized material after the final heat treatment.

In addition, the support of the present invention may be a support for carrying a catalyst having a peak at a diffraction angle of around 26° in an X-ray diffraction pattern, the peak including 20 to 45% of a graphite-like structure component and 55 to 80% of an amorphous component.

That is, as illustrated in FIG. 1 to be described later, when the carbonized material for constituting the support of the present invention is subjected to X-ray diffraction (for example, $CuK\alpha$ is used as an incident X-ray) and a peak at a diffraction angle (2θ) of around 26° (e.g., 25° to 27°) is separated in the resultant X-ray diffraction pattern, the area ratio of a peak attributed to a graphite-like structure component corresponding to (002) plane reflection of a carbon structure and a peak attributed to an amorphous component is 20 to 45:55 to 80. As for the ratios of the respective components, the ratio of the graphite-like structure component may also be preferably 30 to 40% and the ratio of the amorphous component may also be preferably 60 to 70%.

In this case, the graphite-like structure of the support of the present invention includes a nanoshell structure obtained by carbonizing raw materials containing a nitrogen-containing organic substance and a metal. The nanoshell structure is a graphite structure-like turbostratic structure, which has been developed in the form of an onion-like laminate around a fine particle of the metal in the raw materials, as illustrated in FIGS. 3(A) and 3(B) to be described later.

In addition, the support of the present invention has a carbon structure including a graphite-like structure, which includes a nanoshell structure, and an amorphous structure, which is amorphous, at such an appropriate ratio as described above, and thus achieves both of high durability and high performance of a catalyst support.

Further, when the support of the present invention is a carbonized material obtained through the metal removal treatment and the heat treatment, the support achieves both of durability and performance of a catalyst support at higher levels. This is probably because a new carbon structure is formed in the support of the present invention through the metal removal treatment and the subsequent heat treatment.

In addition, the support of the present invention may be a support for carrying a catalyst having an intensity ratio of a band at 1,360 cm$^{-1}$ to a band at 1,580 cm$^{-1}$ ($I_{1,360}/I_{1,580}$) in a Raman spectrum of 0.3 or more and 1.0 or less.

That is, when the carbonized material for constituting the support of the present invention is subjected to Raman spectral measurement, in the resultant Raman spectrum, in addition to a peak having a Raman shift of around 1,580 cm$^{-1}$ (G band), a peak having a Raman shift of around 1,360 cm$^{-1}$ (D band) appears, and the ratio of the intensity of the D band ($I_{1,360}$) to the intensity of the G band ($I_{1,580}$) ($I_{1,360}/I_{1,580}$) is 0.3 or more and 1.0 or less. The intensity ratio D/G ($I_{1,360}/I_{1,580}$) may be preferably 0.3 or more and 0.8 or less.

In this case, the band at 1,360 cm$^{-1}$ (D band) reflects the disorder of a crystal structure in a carbon material, and hence the intensity ratio D/G ($I_{1,360}/I_{1,580}$) serves as an indicator of structural disorder and defects in a carbon material. That is, as the amounts of the structural disorder and defects in a carbon material become larger, the intensity ratio D/G ($I_{1,360}/I_{1,580}$) of the carbon material becomes larger.

In addition, the support of the present invention has a carbon structure including structural disorder and defects in an appropriate balance indicated by the range of the intensity ratio D/G ($I_{1,360}/I_{1,580}$) as described above, and thus achieves both of high durability and high performance of a catalyst support.

A carrier with supported catalyst according to this embodiment (hereinafter, referred to as "catalyst body of the present invention") is a carrier with supported catalyst including the support for carrying a catalyst described above and a noble metal catalyst carried by the support for carrying a catalyst.

The noble metal catalyst carried by the catalyst body of the present invention is not particularly limited as long as it is a noble metal having a catalytic activity, and one or two or more kinds of arbitrary noble metal catalysts may be used. Specifically, as the noble metal catalyst, there may be used, for example, one or two or more kinds selected from the group consisting of platinum, palladium, ruthenium, rhodium, and iridium.

A method of carrying the noble metal catalyst is not particularly limited. That is, for example, the support of the present invention may be immersed in a solution containing a noble metal catalyst and held at a predetermined temperature for a predetermined time period to cause the support of the present invention to carry the noble metal catalyst.

The amount of the noble metal catalyst carried in the catalyst body of the present invention is not particularly limited as long as a desired catalytic activity is exerted. That is, the catalyst body of the present invention may carry the noble metal catalyst in an amount of, for example, 0.1 to 80 wt % with respect to the support of the present invention (0.1 to 80 parts by weight with respect to 100 parts by weight of the support of the present invention), preferably 0.1 to 60 wt %.

In addition, the catalyst body of the present invention may be a carrier with supported catalyst having a ratio of a current value upon application of 1.5 V in the 50th cycle to a current value upon application of 1.5 V in the fifth cycle of 90% or more in the case of performing a cycle of sweeping a potential in the range of 0 to 1.6 V continuously 50 times in cyclic voltammetry.

That is, in the case where a cycle of sweeping a potential in the range of 0 to 1.6 V is performed continuously 50 times in cyclic voltammetry using the catalyst body of the present invention as a working electrode, when a current value flowing through the working electrode upon application of a voltage of 1.5 V in the fifth cycle is defined as 100%, a current value flowing through the working electrode upon application of a voltage of 1.5 V in the 50th cycle is maintained at 90% or more. In other words, the current value upon application of 1.5 V in the 50th cycle does not decrease by 10% or more with respect to the current value upon application of 1.5 V in the fifth cycle.

An electrode according to this embodiment (hereinafter, referred to as "electrode of the present invention") is an electrode including the carrier with supported catalyst described above. That is, the electrode of the present invention is an electrode carrying the catalyst body of the present invention described above. Specifically, the electrode of the present invention is, for example, an electrode including a predetermined electrode base material and the catalyst body of the present invention carried by the electrode base material.

The electrode of the present invention may be, for example, an electrode for a fuel cell, and may be preferably an electrode for a polymer electrolyte fuel cell (PEFC). When the electrode of the present invention is an electrode for a fuel cell, the electrode of the present invention is preferably a cathode.

That is, the catalyst body of the present invention described above may be, for example, an electrode catalyst for a fuel cell, and may be preferably an electrode catalyst for a PEFC. In addition, when the catalyst body of the present invention is an electrode catalyst for a fuel cell, the catalyst body of the present invention is preferably a cathode catalyst.

A battery according to this embodiment (hereinafter, referred to as "battery of the present invention") is a battery including the electrode described above. That is, the battery of the present invention is a battery including the electrode of the present invention described above as one, or both, of a cathode and an anode.

The battery of the present invention may be, for example, a fuel cell, and may be preferably a PEFC. That is, the battery of the present invention may be, for example, a PEFC including a membrane electrode assembly including the electrode of the present invention.

Specifically, the battery of the present invention may be, for example, a PEFC including a membrane electrode assembly of a polymer electrolyte membrane integrated with a cathode (positive electrode or air electrode) and an anode (negative electrode or fuel electrode) respectively formed on one side and the other side of the polymer electrolyte membrane, and including the electrode of the present invention as one, or both, of the cathode and the anode. In this case, the battery of the present invention preferably includes the electrode of the present invention at least as the cathode.

As described above, according to this embodiment, there is provided a support for carrying a catalyst, a carrier with supported catalyst, an electrode, and a battery, each achieving both of durability and performance of a catalyst support at high levels. That is, the support of the present invention, in which a unique graphite-like structure including a nanoshell structure has developed to an appropriate extent, is manufactured by carbonizing raw materials containing a nitrogen-containing organic substance and a metal.

The unique carbon structure is, for example, such a carbon structure that a diffraction pattern including a graphite-like structure component and an amorphous component at an appropriate ratio is obtained in X-ray diffraction as described above and/or the intensity ratio D/G ($I_{1,360}/I_{1,580}$) within an appropriate range is obtained in Raman spectral measurement as described above.

In addition, the support of the present invention having the unique carbon structure hardly undergoes oxidation and corrosion. Also, it is considered that a large number of sites for carrying a noble metal catalyst are formed in the support of the present invention. In addition, unlike a conventional highly crystalline carbon material, it is not necessary to perform any heating treatment at high temperature. This contributes to a reduction in energy cost.

Further, when the support of the present invention is a carbonized material obtained through the metal removal treatment and the heat treatment, the support of the present invention has a more unique carbon structure formed by the treatments. As a result, the support serves as a support for carrying a catalyst achieving both of durability and performance of a catalyst support at higher levels.

In addition, the catalyst body of the present invention obtained by causing such support of the present invention to carry a noble metal catalyst such as platinum is excellent in durability under a high potential and effectively suppresses the dissolution and occurrence of aggregation of the noble metal catalyst. That is, in the catalyst body of the present invention, a noble metal catalyst such as platinum is stably held in a dispersed state as a fine particle having a particle diameter in an order of several nm, and the deterioration of the noble metal catalyst itself is effectively suppressed.

In addition, the support of the present invention itself has an oxygen reduction activity based on a graphite-like structure including a nanoshell structure, and thus the catalyst body of the present invention exhibits an oxygen reduction activity at a high level. Thus, even when the amount of the noble metal catalyst such as platinum to be carried in the catalyst body of the present invention is reduced, a carrier with supported catalyst having an activity sufficient for practical use is provided.

In addition, in the electrode and the battery, each including such a catalyst body of the present invention, even when a load such as a high potential is applied, the support of the present invention hardly deteriorates. As a result, high performance is stably maintained.

That is, for example, when platinum deteriorates in a fuel cell, there arises a problem in that the ratio of a two-electron reaction increases in a cathode to generate hydrogen peroxide in a large amount. In contrast, when the battery of the present invention is realized as a fuel cell including the electrode of the present invention, the support of the present invention itself in the electrode of the present invention has an oxygen reduction activity, and hence the ratio of a four-electron reaction is maintained at a high ratio.

Next, specific examples according to this embodiment are described.

Example 1

Preparation of Raw Materials 30.93 g of acrylonitrile and 4.07 g of methacrylic acid were polymerized in distilled water under a nitrogen atmosphere at 70° C. for 4 hours. The resultant reaction solution was concentrated with a rotary evaporator and dried with a vacuum dryer. Thus, a polyacrylonitrile-polymethacrylic acid copolymer was obtained.

Next, 30 g of dimethylformamide, 1.5 g of 2-methylimidazole, and 1.5 g of cobalt chloride hexahydrate ($CoCl_2 \cdot 6H_2O$) were added to 1.5 g of the copolymer, and the mixture was dried.

Further, the mixture was heated in the atmosphere so that its temperature was increased from room temperature to 150° C. in 30 minutes. Subsequently, the temperature was increased from 150° C. to 220° C. over 2 hours. After that, the mixture was held at 220° C. for 3 hours so that the mixture was made infusible. Thus, raw materials for a carbonized material were prepared.

[Carbonization]

Next, the carbonization of the raw materials was performed. That is, 1.5 g of the raw material subjected to the infusible treatment as described above was placed in a quartz boat and subjected to nitrogen purge in an image furnace for 20 minutes (nitrogen flow rate: 0.7 L/min), and then its temperature was increased from room temperature to 1,000° C. at a rate of temperature increase of 50° C./min by heating. After that, the raw material was held at 1,000° C. for 1 hour. Thus, a carbonized material was obtained.

Further, the carbonized material was pulverized. That is, the carbonized material was loaded into a planetary ball mill (P-7 manufactured by FRITSCH JAPAN CO., LTD.), zirconia balls each having a diameter of 10 mm were set, and pulverization was performed at a rotational speed of 650 rpm for 50 minutes. After that, the pulverized carbonized material was taken out and passed through a sieve having an aperture of 106 μm. The carbonized material that had passed the sieve was collected.

[Metal Removal Treatment]

Next, a metal removal treatment (acid treatment) was performed. That is, 100 mL of concentrated hydrochloric acid was added to 1 g of the carbonized material pulverized as described above, and the mixture was stirred for 1 hour. Then, the carbonized material was precipitated and the solution was removed. After that, 100 mL of a solution prepared by mixing concentrated hydrochloric acid and distilled water at 1:1 (volume ratio) was added to the carbonized material, and then the mixture was stirred for 1 hour. After the carbonized material had been precipitated and the solution had been removed, 100 mL of distilled water was added to the carbonized material, and then the mixture was stirred for 1 hour. Thus, a metal (Co) was removed from the carbonized material. After that, the carbonized material was washed with distilled water, suction-filtered, and dried with a vacuum dryer.

[Heat Treatment]

Next, a heat treatment was performed. That is, the carbonized material subjected to the acid treatment as described above was placed in a quartz boat and subjected to nitrogen purge in an image furnace for 20 minutes (nitrogen flow rate: 0.7 L/min), and then its temperature was increased from room temperature to 700° C. at a rate of temperature increase of 50° C./min by heating. After that, the carbonized material was held at 700° C. for 1 hour.

Further, the carbonized material was pulverized. That is, the carbonized material was loaded into a planetary ball mill (P-7 manufactured by FRITSCH JAPAN CO., LTD.), zirconia balls each having a diameter of 10 mm were set, and pulverization was performed at a rotational speed of 450 rpm for 20 minutes. After that, the pulverized carbonized material was taken out and passed through a sieve having an aperture of 106 μm. The carbonized material that had passed the sieve was obtained as a support for carrying a catalyst (IK(Co)1,000° CAW).

[Catalyst Loading Procedure]

Next, a catalyst loading procedure was performed using platinum (Pt) at 10 wt % with respect to the support. That is, a platinum-containing solution was prepared by dissolving 0.265 g of chloroplatinic acid (containing 0.1 g of platinum) in 100 g of distilled water. Next, 1 g of the support (IK(Co) 1,000° CAW) formed of the carbonized material obtained as described above was added to the platinum-containing solution, and the mixture was refluxed at 100° C. for 3 hours. After that, the carbonized material was washed with distilled water and collected by suction filtration. The carbonized material, which was further subjected to vacuum drying and then to a reduction treatment in a hydrogen atmosphere at 650° C., was obtained as a carrier with supported catalyst (Pt/IK(Co)1,000° CAW) formed of the carbonized material carrying platinum.

Example 2

A support for carrying a catalyst (IK(Mn)800° CAW) and a carrier with supported catalyst (Pt/IK(Mn)800° CAW) were obtained in the same manner as in Example 1 above except that 1.70 g of manganese (II) chloride tetrahydrate ($MnCl_2.4H_2O$) was used instead of cobalt chloride hexahydrate ($CoCl_2.6H_2O$) in the preparation of the raw materials and the carbonization was performed at 800° C.

Example 3

A support for carrying a catalyst (IK(Fe) 800° CAW) and a carrier with supported catalyst (Pt/IK(Fe)800° CAW) were obtained in the same manner as in Example 1 above except that 1.25 g of iron(III) chloride hexahydrate ($FeCl_3.6H_2O$) was used instead of cobalt chloride hexahydrate ($CoCl_2.6H_2O$) in the preparation of the raw materials and the carbonization was performed at 800° C.

Example 4

A carbonized material was obtained as a support for carrying a catalyst (IK(Co) 1,000° C. (–)) by carbonization in the same manner as in Example 1 above except that none of the metal removal treatment (acid treatment) and the heat treatment was performed. In addition, a carrier with supported catalyst (Pt/IK(Co)1,000° C. (–)) formed of the carbonized material carrying platinum was obtained by subjecting the carbonized material to the same catalyst loading procedure as that in Example 1 above.

Comparative Example 1

Ketjen Black (ECP600JD manufactured by Lion Corporation) was prepared as a support for carrying a catalyst (KB). In addition, a carrier with supported catalyst formed of the ketjen black carrying platinum (Pt/KB) was obtained by performing the same catalyst loading procedure as that in Example 1 above except that the support for carrying a catalyst (KB) was used instead of the carbonized material (IK(Co) 1,000° CAW).

Comparative Example 2

Highly graphitized carbon black (SCB-GF manufactured by SEC CARBON, LIMITED) was prepared as a carbon material for carrying a catalyst (GCB). In addition, a carrier with supported catalyst formed of the highly graphitized carbon black carrying platinum (Pt/GCB) was obtained by performing the same catalyst loading procedure as that in Example 1 above except that the support for carrying a catalyst (GCB) was used instead of the carbonized material (IK(Co)1,000° CAW).

Comparative Example 3

Graphite (RC-VERS manufactured by TIMCAL Graphite & Carbon) was prepared as a carbon material for carrying a catalyst (Gr). In addition, a carrier with supported catalyst formed of the graphite carrying platinum (Pt/Gr) was obtained by performing the same catalyst loading procedure as that in Example 1 above except that the support for carrying a catalyst (Gr) was used instead of the carbonized material (IK(Co)1,000° CAW).

Comparative Example 4

A support for carrying a catalyst (IK(–)1,000° CAW) and a carrier with supported catalyst (Pt/IK(–)1,000° CAW) were obtained in the same manner as in Example 1 above except that cobalt chloride hexahydrate ($CoCl_2.6H_2O$) was not used in the preparation of the raw materials.

Comparative Example 5

A support for carrying a catalyst (IK(–)1,000° C.(–)) and a carrier with supported catalyst (Pt/IK(–)1,000° C.(–)) were obtained in the same manner as in Example 1 above except that cobalt chloride hexahydrate ($CoCl_2.6H_2O$) was not used in the preparation of the raw materials and none of the metal removal treatment (acid treatment) and the heat treatment was performed.

Example 5

[X-ray Diffraction]

Each of the supports for carrying a catalyst obtained in Examples 1 to 4 and Comparative Examples 1 to 5 above was analyzed by powder X-ray diffractometry, and ratios of a graphite-like structure component and an amorphous component in a carbon structure of each of the supports were evaluated.

That is, X-ray diffraction measurement was performed with an X-ray diffractometer (Rigaku RINT2100/PC, Rigaku Corporation). A voltage and a current applied to an X-ray tube were 50 kV and 300 mA, respectively. A sampling interval was 0.01°, a scanning speed was 0.5°/min, and a measured angle range (2θ) was 5 to 40°. CuKα was used as an incident X-ray.

Then, a peak at a diffraction angle 2θ of around 26° was separated into a peak attributed to a graphite-like structure component (component with a developed structure) corresponding to the (002) plane reflection of a carbon structure and a peak attributed to an amorphous component (component with an undeveloped structure), and ratios of the respective components were calculated based on areas of the respective peaks.

The peak separation was performed with commercially available analysis software (IGOR manufactured by Wave Metrics). In the peak separation, in order to evaluate a structure, a main peak at 2θ=around 26° was separated into two components, i.e., a sharp peak) (2θ=26.4°) attributed to a graphite-like structure component and a broad peak attributed to an amorphous component. As a method for the peak separation, the following method was employed: peaks overlapping each other were approximated by overlapping Lorentzian basic waveforms and corrected for polarization factors and atomic scattering factors for carbon to give diffraction patterns; each of the diffraction patterns was optimized for its peak intensity, peak half width, and peak position; and curve fitting was performed on the assumption that each of the peaks was Gaussian.

FIG. 1 illustrates an example of the results of peak separation of a main peak at a diffraction angle 2θ of around 26° of the support for carrying a catalyst (IK(Co)1,000° CAW) obtained in Example 1 above. As illustrated in FIG. 1, the peak separation yielded two peaks, i.e., a peak attributed to a graphite-like structure component and a peak attributed to an amorphous component.

[Raman Spectroscopy]

Each of the supports for carrying a catalyst obtained in Examples 1 to 4 and Comparative Examples 1 to 5 above was analyzed by Raman spectroscopy, and structural disorder and defects in each of the carbon materials were evaluated. That is, the ratio of the intensity of a peak having a Raman shift of around 1,360 cm$^{-1}$ (D band) to the intensity of a peak having a Raman shift of around 1,580 cm$^{-1}$ (G band) ($I_{1,360}/I_{1,580}$) was evaluated. A Raman spectrum was obtained by measurement with a HORIBA Micro Laser Raman Spectrometer (LabRAM, HORIBA Jobin Yvon) at an excitation wavelength of 532 nm under the condition of exposure: 5 seconds×integration: 5 times.

A smaller intensity ratio D/G ($I_{1,360}/I_{1,580}$) indicates less structural disorder and defects. It should be noted that in general, as structural disorder and defects becomes less and a degree of graphitization becomes higher in a carbon material, the durability (corrosion resistance) of a carrier with supported catalyst formed of the carbon material carrying a catalyst such as platinum becomes higher.

[Amount of Catalyst Carried]

Each of the carriers with supported catalysts obtained in Examples 1 to 4 and Comparative Examples 1 to 5 above was evaluated for its amount of the catalyst carried. That is, as described above, a catalyst loading procedure was performed using 0.1 g of platinum (Pt) with respect to 1 g of a support, and the amount (wt %) of platinum actually carried by the support was defined as the amount of the catalyst carried. Specifically, 10 mg of the carrier with supported catalyst was placed in a crucible and ashed with a muffle furnace in air at 700° C. for 3 hours. Then, 4 mL of aqua regia were added thereto, and the mixture was heated to dissolve platinum. The resultant was diluted with distilled water, and platinum was then quantified by inductively coupled plasma (ICP) emission spectral analysis.

[Durability Test]

Each of the carriers with supported catalysts obtained in Examples 1 to 4 and Comparative Examples 1 to 5 above was evaluated for its durability under such a condition that a voltage was applied repeatedly. A catalyst slurry containing each of the carriers with supported catalysts was first prepared. Specifically, 50 μL of a 5 wt % Nafion (registered trademark) solution (manufactured by Aldrich), 150 μL of ethanol, and 150 μL of distilled water were added to 5 mg of the carrier with supported catalyst, glass beads were further added, and the mixture was ultrasonicated for 10 minutes. Thus, a homogeneous catalyst slurry was obtained.

Next, 4 μL of the catalyst slurry was aspirated with a pipette and applied onto a disk electrode (diameter: 6 mm) of a rotating ring-disk electrode apparatus (RRDE-1 SC-5 manufactured by Nikko Keisoku Y. K.), followed by drying. Thus, a working electrode was produced. A 0.5 M sulfuric acid aqueous solution saturated with nitrogen at room temperature was used as an electrolyte solution. In addition, a silver-silver chloride electrode (Ag/AgCl/saturated KCl) was used as a reference electrode. Then, a rotating electrode was immersed in the electrolyte solution. In cyclic voltammetry using each of the carriers with supported catalysts as the working electrode, a cycle of sweeping a potential in the range of 0 to 1.6 V at a sweep speed of 0.5 mV/sec was performed continuously 50 times, and a current value flowing through the working electrode was measured.

Then, the ratio of a current value upon application of a voltage of 1.5 V measured in the 50th cycle to a current value upon application of a voltage of 1.5 V measured in the fifth cycle was determined as an endurance ratio (%). A lower endurance ratio means that a carrier with supported catalyst is poor in durability and is liable to undergo corrosion.

[Evaluation Results]

FIG. 2 illustrates the results of evaluation as described above of the supports for carrying a catalyst and carriers with supported catalysts obtained in Examples 1 to 4 and Comparative Examples 1 to 5. That is, FIG. 2 illustrates the kind of a support for carrying a catalyst used in each of Examples and Comparative Examples, the ratio (%) of a graphite-like structure component and the ratio (%) of an amorphous component obtained by subjecting the support for carrying a catalyst to X-ray diffraction (XRD), the intensity ratio D/G ($I_{1,360}/I_{1,580}$) obtained by subjecting the support for carrying a catalyst to Raman spectral measurement, the endurance ratio (%) of a carrier with supported catalyst obtained by causing the support for carrying a catalyst to carry a catalyst (Pt), and the amount (wt %) of the catalyst (Pt) carried in the carrier with supported catalyst.

As illustrated in FIG. 2, in each of the supports according to Examples 1 to 4, the ratio of the graphite-like structure component obtained by XRD was 30 to 40%, the ratio of the amorphous component was 60 to 70%, and the intensity ratio D/G ($I_{1,360}/I_{1,580}$) obtained by Raman spectroscopy was 0.6 to 0.75.

On the other hand, in each of the supports according to Comparative Examples 4 and 5 obtained by carbonizing raw materials free of a metal, the ratio of the graphite-like structure component was less than 30%, the ratio of the amorphous component was more than 70%, and the intensity ratio D/G was more than 0.8.

In addition, in each of the supports according to Comparative Examples 2 and 3 formed of carbon black having an increased degree of graphitization or graphite, the ratio of the graphite-like structure component was more than 50%, the ratio of the amorphous component was less than 50%, and the intensity ratio D/G was less than 0.2. In addition, in the support according to Comparative Example 1 formed of ketjen black, the ratio of the graphite-like structure component was 1%, the ratio of the amorphous component was 99%, and the intensity ratio D/G was 1.27.

Those results revealed that each of the supports according to Examples 1 to 4 had a higher degree of crystallinity (degree of graphitization) compared to each of the supports according to Comparative Examples 1, 4, and 5, and had a lower degree of crystallinity compared to each of the supports according to Comparative Examples 2 and 3.

In addition, as illustrated in FIG. 2, the endurance ratio of any of the carriers with supported catalysts according to Examples 1 to 4 was higher compared to each of the carriers with supported catalysts according to Comparative Examples 1 to 5. That is, in the cyclic voltammetry using each of the carriers with supported catalysts according to Examples 1 to 4, even when a cycle of voltage application was repeated 50 times, the current value was maintained at 90% or more. In particular, the current value of each of the carriers with supported catalysts according to Examples 1 to 3 using the supports subjected to the metal removal treatment (acid treatment) and the heat treatment was maintained at 95% or more.

On the other hand, in the case of using each of the carriers with supported catalysts according to Comparative Examples 1 to 5, the current value decreased to less than 90% after the cycle of voltage application had been performed 50 times. In particular, in the carrier with supported catalyst according to Comparative Example 1, the current value decreased to 45%.

Further, the amount of the catalyst carried in any of the carriers with supported catalysts according to Examples 1 to 4 was as high as 5.9 to 8.4 wt % (the amount of the catalyst carried with respect to 100 wt % of the support was 5.9 to 8.4 wt %). On the other hand, the amount of the catalyst carried in the carrier with supported catalyst according to Comparative Example 1 was 6.3 wt %, whereas the amount of the catalyst carried in each of the carriers with supported catalysts according to Comparative Examples 2 to 5 was as low as 4.0 wt % or less.

The above-mentioned results demonstrated that each of the carriers with supported catalysts according to Examples 1 to 4 achieved both of high durability under a voltage application condition and high performance of a catalyst support, and thus was highly useful.

It was considered that both of durability and performance of a catalyst support were achieved in each of those carriers with supported catalysts according to Examples 1 to 4 because the carbon structure of each of the supports according to Examples 1 to 4 included a graphite-like structure and an amorphous structure in an appropriate balance, and the graphite-like structure included a nanoshell structure.

That is, as shown in the results of Comparative Examples 1 to 5 as well, in general, as the ratio of a graphite structure or a graphite-like structure in a carbon material becomes higher (the degree of graphitization becomes higher), the durability becomes higher but the catalyst becomes more unlikely to be carried (Comparative Examples 2 and 3). In contrast, as the ratio of the amorphous component in the carbon material becomes higher, the catalyst becomes more likely to be carried but the durability becomes lower (Comparative Example 1).

In addition, in Comparative Examples 4 and 5 using the supports obtained by carbonizing raw materials free of a metal, each of which was manufactured by the same production method as in the foregoing, the development of a graphite-like structure (in particular, a graphite-like structure including a nanoshell structure) was insufficient, and hence the durability and the amount of the catalyst carried were also insufficient.

On the other hand, it is considered that in the carrier with supported catalyst using each of the supports according to Examples 1 to 4, both of high durability and high performance of a catalyst support were achieved because the development of a graphite-like structure including a nanoshell structure was sufficient, and an amorphous structure was also included at an appropriate ratio in each of the supports.

In addition, each of the carriers with supported catalysts according to Examples 1 to 3 using the supports subjected to the metal removal treatment (acid treatment) and the heat treatment was particularly excellent in durability and performance of a catalyst support. That is, each of the carriers with supported catalysts according to Examples 1 to 3 had an additionally high endurance ratio compared to the carrier with supported catalyst according to Example 4 using the support not subjected to the metal removal treatment (acid treatment) and the heat treatment.

In addition, in each of the carriers with supported catalysts according to Examples 1 to 3, the amount of the catalyst carried was large even compared to the carrier with supported catalyst according to Comparative Example 1 in which the ratio of the amorphous component was very high, at 99%. That is, each of the carriers with supported catalysts according to Examples 1 to 3 was excellent in performance of a catalyst support although the ratio of the amorphous component was lower than in the carrier with supported catalyst according to Comparative Example 1.

Such high performance of a catalyst support was probably due to a unique carbon structure newly formed by the additional heat treatment in addition to an increase in the number of sites for carrying a catalyst by the metal removal treatment (acid treatment) in each of the supports according to Examples 1 to 3.

Example 6

The stability of a platinum particle carried by the carrier with supported catalyst was evaluated. That is, the carrier with supported catalyst was calcinated under a predetermined condition, and the aggregation of the platinum particle in the carrier with supported catalyst after the calcination and the like were evaluated with a transmission electron microscope (TEM).

Specifically, the carrier with supported catalyst obtained in Example 1 and the carrier with supported catalyst obtained in Comparative Example 1 were each mounted on a quartz boat and subjected to nitrogen purge in an image furnace for 20 minutes (nitrogen flow rate: 0.7 L/min), and then their temperatures were increased from roam temperature to 700° C. at a rate of temperature increase of 50° C./min by heating. After that, these carriers with supported catalysts were each held at 700° C. for 1 hour. Then, each of the carriers with supported catalysts after calcination was observed with a TEM. It should be noted that the carrier with supported catalyst according to Example 1 was observed with a TEM before calcination as well.

FIGS. 3(A) to 3(D) illustrate TEM observation results. FIGS. 3(A) and 3(B) each illustrate a TEM photograph of the carrier with supported catalyst according to Example 1 before calcination, FIG. 3(C) illustrates a TEM photograph of the carrier with supported catalyst according to Example 1 after calcination, and FIG. 3(D) illustrates a TEM photograph of the carrier with supported catalyst according to Comparative Example 1 after calcination.

As illustrated in FIGS. 3(A) and 3(B), in the carrier with supported catalyst according to Example 1 before calcination, platinum (Pt) particles each having a particle diameter of an order of about 5 to 10 nm were carried at a high density in a dispersed state. In addition, the development of a nanoshell structure, i.e., graphite structure-like turbostratic structure, which developed in the form of an onion-like laminate, was observed as well.

In addition, as illustrated in FIG. 3(C), in the carrier with supported catalyst according to Example 1, the particle diameter of platinum was maintained at 10 nm or less even after calcination, revealing that no problem such as aggregation of platinum occurred.

On the other hand, as illustrated in FIG. 3(D), in the carrier with supported catalyst according to Comparative Example 1 carrying platinum on ketjen black, the aggregation of platinum was observed after calcination. The aggregation of platinum is not preferred because it causes problems such as a decrease in surface area necessary for the expression of a catalytic activity.

A load to be applied to platinum during calcination at 700° C. for 1 hour is estimated to exceed a load due to a fluctuation in potential in a cathode of a fuel cell. It was therefore considered that the carrier with supported catalyst according to Example 1 hardly caused problems such as aggregation of platinum even when actually used as a cathode catalyst for a fuel cell.

Example 7

The oxygen reduction activity of the carrier with supported catalyst was evaluated. That is, first, a catalyst slurry containing any one of the carrier with supported catalyst obtained in Example 1 or the carrier with supported catalyst obtained in Comparative Example 1 described above was prepared. Specifically, to 5 mg of the carrier with supported catalyst were added 50 μL of a 5 wt % Nafion (registered trademark) solution (manufactured by Aldrich), 150 μL of ethanol, 150 μL of distilled water, and glass beads, and the mixture was ultrasonicated for 10 minutes. Thus, a catalyst slurry was obtained.

Next, the oxygen reduction activity was evaluated. That is, 4 μL of the catalyst slurry described above was aspirated with a pipette and applied onto a disk electrode (diameter: 6 mm) of a rotating ring-disk electrode apparatus (RRDE-1 SC-5 manufactured by Nikko Keisoku Y. K.), followed by drying. Thus, a working electrode was produced. In addition, a platinum electrode was used as a counter electrode, and a silver-silver chloride electrode (Ag/AgCl/saturated KCl) was used as a reference electrode. A 0.5 M sulfuric acid aqueous solution having dissolved therein oxygen at normal temperature was used as an electrolyte solution.

Then, the electrodes were immersed in the electrolyte solution and rotated at a rotational speed of 1,500 rpm, and a current density during potential sweep at a sweep speed of 0.5 mV/sec was recorded as a function of a potential. From the resultant polarization curve, a voltage at which a reduction current of −10 μA/cm$^2$ flowed was recorded as an oxygen reduction-starting potential ($E_{O2}$).

FIG. 4 illustrates the evaluation results of the oxygen reduction activity. As illustrated in FIG. 4, the oxygen reduction-starting potential of the carrier with supported catalyst according to Example 1 was 0.942 V exceeding that of the carrier with supported catalyst according to Comparative Example 1, i.e., 0.919 V. That is, the carrier with supported catalyst according to Example 1 was found to have high oxygen reduction activity power.

This was possibly due to the following reasons: the support for constituting the carrier with supported catalyst according to Example 1 had a carbon structure including a nanoshell structure that easily carries platinum, and hence had a larger amount of platinum carried compared to the carrier with supported catalyst according to Comparative Example 1, and moreover, the support according to Example 1 itself had an oxygen reduction activity based on the nanoshell structure. It should be noted that the evaluation of the oxygen reduction activity was similarly attempted in each of the carriers with supported catalysts according to Comparative Examples 2 and 3, but no oxygen reduction-starting potential was measured.

Example 8

The durability of a support itself not carrying platinum was evaluated. That is, the support for carrying a catalyst (IK(Co) 1,000° CAW) according to Example 1 and the support for carrying a catalyst (KB) according to Comparative Example 1 described above were each evaluated for durability under the condition of repeated voltage application in the same manner as in the durability test in Example 5 above.

Then, in the case where a current value upon application of a voltage of 1.5 V measured in the fifth cycle was defined as "1", a current value upon application of a voltage of 1.5 V measured in the 50th cycle was determined as a relative current value.

Figure 5:
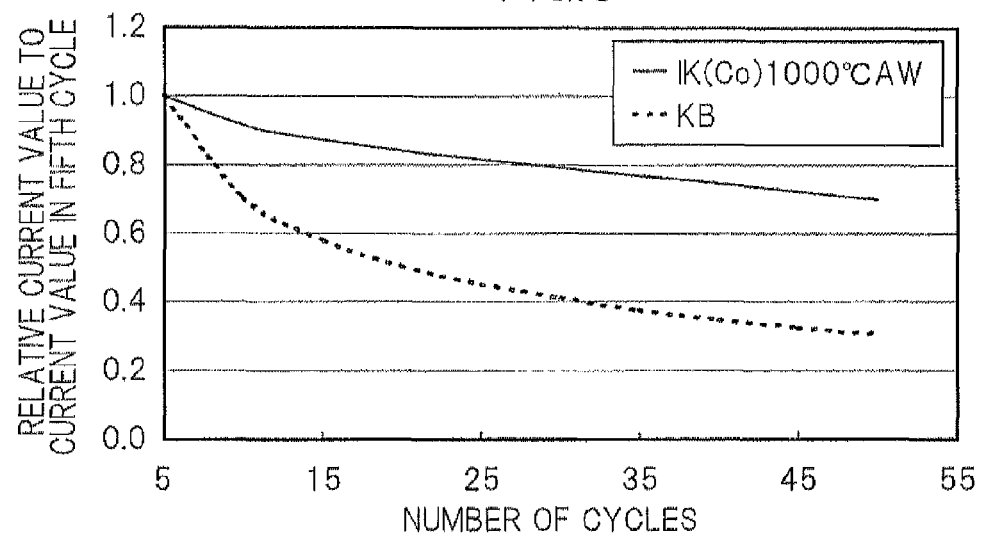
[FIG. 5] An explanatory diagram illustrating an example of results of evaluation of durability of a support for carrying a catalyst according to an embodiment of the present invention.

FIG. 5 illustrates a time-dependent change in relative current value measured for each of the supports. In FIG. 5, the result obtained using the support according to Example 1 is indicated by a solid line, and the result obtained using the support according to Comparative Example 1 is indicated by a dashed line.

As illustrated in FIG. 5, in the case of using the support according to Example 1, the relative current value in the 50th cycle was maintained at about 0.7. On the other hand, in the case of using the support according to Comparative Example 1, the relative current value in the 50th cycle decreased to about 0.3.

As described above, the support according to Example 1 has a carbon structure including about 30% of a graphite-like structure including a nanoshell structure (see FIG. 2) and thus has high durability. Probably for this reason, corrosion due to an oxidation reaction hardly occurred even under a high potential condition. On the other hand, the support according to Comparative Example 1 was low in durability and rapidly deteriorated through repeated voltage application, probably because of containing only 1% of the graphite-like structure component.

Example 9

A carrier with supported catalyst carrying platinum was evaluated for its longer-term durability under harsher conditions. That is, the carrier with supported catalyst (Pt/IK(Co) 1,000° CAW) according to Example 1 and the carrier with supported catalyst (Pt/KB) according to Comparative Example 1 described above were each evaluated for durability under such a condition that only a high voltage was repeatedly applied a larger number of times.

Specifically, first, an oxygen reduction-starting potential ($E_{O2}$) was measured by the same method as in Example 7 above. Next, a cycle of sweeping a potential in the range of 0.9 to 1.3 V in a 0.5 M sulfuric acid aqueous solution saturated with nitrogen at a sweep speed of 200 mV/sec was continuously performed 5,000 times. In addition, the oxygen reduction-starting potential ($E_{o2}$) was measured again by the same method as in Example 7 above.

Figure 6:
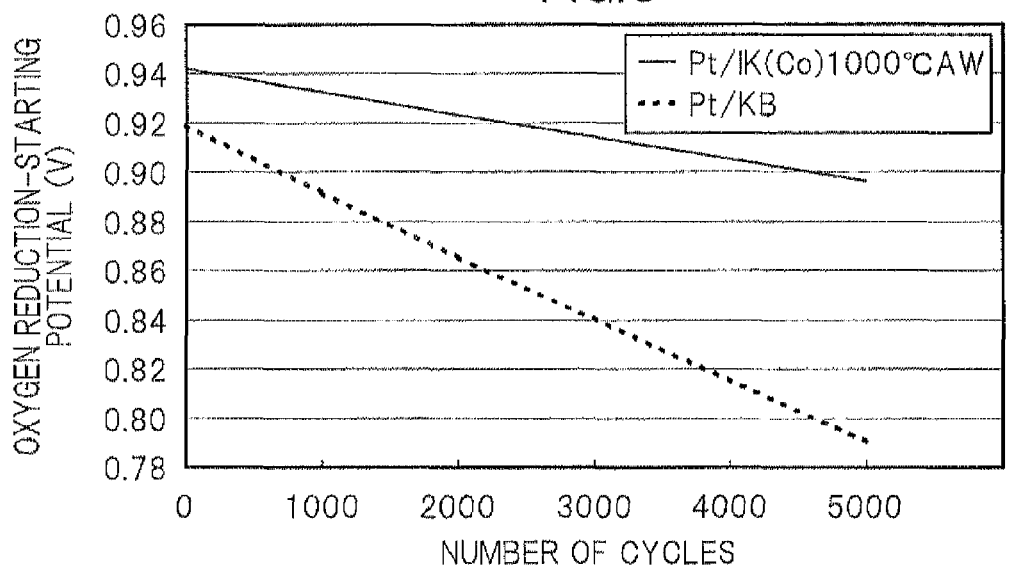
[FIG. 6] An explanatory diagram illustrating an example of results of evaluation of durability of a carrier with supported catalyst according to an embodiment of the present invention.

FIG. 6 illustrates a time-dependent change in oxygen reduction-starting potential (V) measured for each carrier with supported catalyst. In FIG. 6, the result obtained using the carrier with supported catalyst according to Example 1 is indicated by a solid line, and the result obtained using the carrier with supported catalyst according to Comparative Example 1 is indicated by a dashed line.

As illustrated in FIG. 6, a reduction in oxygen reduction-starting potential due to an increase in number of cycles was slower in the case of using the carrier with supported catalyst according to Example 1 compared to the case of using the carrier with supported catalyst according to Comparative Example 1. That is, it was found that the catalytic activity of the carrier with supported catalyst according to Example 1 hardly decreased compared to that of the carrier with supported catalyst according to Comparative Example 1. In addition, the oxygen reduction-start potential in the case of using the carrier with supported catalyst according to Example 1 was higher compared to the case of the carrier with supported catalyst according to Comparative Example 1.

The invention claimed is:

1. A support for carrying a catalyst, comprising a carbonized material containing nitrogen atoms and a metal,
wherein the support has a catalyst-supporting performance such that when the support is loaded with 10 wt % of a platinum catalyst with respect to the support, the platinum catalyst is retained on the support in a proportion of at least 6.7 wt % and not more than 10 wt % with respect to the support after subjecting the support to the refluxing, washing, filtering, drying and then reducing steps.

2. The support for carrying a catalyst according to claim 1, wherein the support has a peak at a diffraction angle of around 26° in an X-ray diffraction pattern, the peak comprising 20 to 45% of a graphite-like structure component and 55 to 80% of an amorphous component.

3. The support for carrying a catalyst according to claim 1, wherein the support has an intensity ratio of a band at 1,360 $cm^{-1}$ to a band at 1,580 $cm^{-1}$ ($I_{1,360}/I_{1,580}$) in a Raman spectrum of 0.3 or more and 0.8 or less.

4. The support for carrying a catalyst according to claim 1, wherein the carbonized material is obtained by carbonizing raw materials containing a nitrogen-containing organic substance and a metal to obtain a carbonized material, subjecting the carbonized material to a metal removal treatment, and then subjecting the resultant carbonized material to a heat treatment at a temperature of 300° C. or more.

5. The support for carrying a catalyst according to claim 1, wherein the metal is a transition metal.

6. A carrier with supported catalyst, comprising:
a support of carbonized material containing nitrogen atoms and a metal; and
a noble metal catalyst that is carried by the support,
wherein the carrier with supported catalyst has a ratio of a current value upon application of 1.5 V in a 50th cycle to a current value upon application of 1.5 V in a fifth cycle of 95% or more in a case of performing a cycle of sweeping a potential in a range of 0 to 1.6 V continuously 50 times in cyclic voltammetry.

7. An electrode, comprising the carrier with supported catalyst according to claim 6.

8. A fuel cell comprising the electrode according to claim 7.

9. The carrier with supported catalyst according to claim 6, wherein the support has a peak at a diffraction angle of around 26° in an X-ray diffraction pattern, the peak comprising 30 to 40% of a graphite-like structure component and 60 to 70% of an amorphous component.

10. The carrier with supported catalyst according to claim 6, wherein the support has an intensity ratio of a band at 1,360 $\mu m^{-1}$ to a band at 1,580 $cm^{-1}$ ($I_{1,360}/I_{1,580}$) in a Raman spectrum of 0.3 or more and 1.0 or less.

11. The carrier with supported catalyst according to claim 6, wherein the carbonized material of the support is obtained by carbonizing raw materials containing a nitrogen-containing organic substance and a metal to obtain a carbonized material, subjecting the carbonized material to a metal removal treatment, and then subjecting the resultant carbonized material to a heat treatment at a temperature of 300° C. or more.

12. The support for carrying a catalyst according to claim 6, wherein the metal is a transition metal.

13. A carried with supported catalyst, comprising:
a support for carrying a catalyst which is obtained by carbonizing raw materials containing a nitrogen-containing organic substance and a metal; and
a noble metal catalyst, which is carried by the support for carrying catalyst;
wherein the support has a catalyst-supporting performance such that when the support is loaded with 10 wt % of a platinum catalyst with respect to the support, the platinum catalyst is retained on the support in a proportion of at least 6.7 wt % and not more than 10 wt % with respect to the support after subjecting the support to fluxing, washing, filtering, drying, and then reducing steps.

14. The support for carrying a catalyst according to claim 1, wherein the support for carrying a catalyst has a peak at a diffraction angle of around 26° in an X-ray diffraction pattern, the peak comprising 30 to 40% of a graphite-like structure component and 60 to 70% of an amorphous component.

15. The support for carrying a catalyst according to claim 1, wherein the support for carrying a catalyst has an intensity ratio of a band at 1,360 $cm^{-1}$ to a band at 1,580 $cm^{-1}$ ($I_{1,360}/I_{1,580}$) in a Raman spectrum of 0.3 or more and 1.0 or less.

16. The support for carrying a catalyst according to claim 3, wherein the support has a carbon structure having structural disorder and defects.

17. The carrier with supported catalyst according to claim 10, wherein the support has a carbon structure having structural disorder and defects.

18. The carrier with supported catalyst according to claim 6, wherein the support is not carried on an electrode base material.

19. The carrier with supported catalyst according to claim 13, wherein the support is not carried on an electrode base material.

* * * * *